US012617086B2

(12) United States Patent　　(10) Patent No.: US 12,617,086 B2
　　Fu　　(45) Date of Patent: May 5, 2026

(54) TEACHING DEVICE, CONTROL DEVICE, AND MECHANICAL SYSTEM

(71) Applicant: FANUC CORPORATION, Yamanashi (JP)

(72) Inventor: Wanfeng Fu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 34 days.

(21) Appl. No.: 18/713,177

(22) PCT Filed: Dec. 17, 2021

(86) PCT No.: PCT/JP2021/046883
§ 371 (c)(1),
(2) Date: May 24, 2024

(87) PCT Pub. No.: WO2023/112342
PCT Pub. Date: Jun. 22, 2023

(65) Prior Publication Data
US 2025/0026010 A1　　Jan. 23, 2025

(51) Int. Cl.
*B25J 9/16* (2006.01)
*B25J 13/08* (2006.01)
*G05B 19/4155* (2006.01)

(52) U.S. Cl.
CPC ........... *B25J 9/1633* (2013.01); *B25J 9/1664* (2013.01); *B25J 13/085* (2013.01); *G05B 19/4155* (2013.01); *G05B 2219/39137* (2013.01)

(58) Field of Classification Search
CPC ...... B25J 9/1633; B25J 9/1664; B25J 13/085; B25J 9/1656; G05B 19/4155; G05B 2219/39137; G05B 19/42

USPC ................. 700/245–264; 318/568.11–568.25
See application file for complete search history.

(56) References Cited

U.S. PATENT DOCUMENTS

| | | | | |
|---|---|---|---|---|
| 6,212,443 B1 * | 4/2001 | Nagata | ................. | G05B 19/423 |
| | | | | 700/63 |
| 8,334,668 B2 * | 12/2012 | Wang | ................. | G05B 19/4142 |
| | | | | 318/575 |
| 9,623,567 B2 * | 4/2017 | Iwatake | ................. | B25J 13/085 |
| 10,112,297 B2 * | 10/2018 | Shimodaira | ............ | B25J 13/085 |
| 10,532,460 B2 * | 1/2020 | Oumi | ..................... | B25J 9/1697 |
| 10,828,782 B2 * | 11/2020 | Noda | ......................... | B25J 9/06 |
| 11,872,698 B2 * | 1/2024 | Takahashi | ............ | G05B 19/421 |
| 2014/0188281 A1 * | 7/2014 | Nagai | ..................... | B25J 9/0081 |
| | | | | 700/264 |
| 2015/0290798 A1 * | 10/2015 | Iwatake | ................. | B25J 13/085 |
| | | | | 700/257 |
| 2015/0323398 A1 * | 11/2015 | Lauzier | ................... | B25J 9/163 |
| | | | | 901/30 |

(Continued)

FOREIGN PATENT DOCUMENTS

| | | |
|---|---|---|
| JP | S59-157715 A | 9/1984 |
| JP | H05-303422 A | 11/1993 |

(Continued)

*Primary Examiner* — Jaime Figueroa
(74) *Attorney, Agent, or Firm* — HAUPTMAN HAM, LLP

(57) ABSTRACT

This teaching device comprises a teaching unit that, using a force detector, binds a force parameter of a force control command for a machine, and a movement trajectory of the machine which executes force control, and that simultaneously teaches the force parameter and the movement trajectory.

19 Claims, 8 Drawing Sheets

(56)  References Cited

U.S. PATENT DOCUMENTS

2016/0354925  A1*  12/2016  Shimodaira ............ B25J 9/1633
2017/0254709  A1*  9/2017  Lauzier ..................... G01L 1/14
2017/0312917  A1*  11/2017  Chung ................. G05B 19/423
2018/0210434  A1  7/2018  Iwatake
2018/0345492  A1*  12/2018  Watanabe ................ B25J 9/044
2019/0195702  A1*  6/2019  Lauzier ................... G01L 25/00
2019/0248006  A1*  8/2019  Takahashi ................ B25J 9/161
2020/0147787  A1*  5/2020  Takahashi .............. B25J 9/1633
2023/0219223  A1  7/2023  Ogura et al.

FOREIGN PATENT DOCUMENTS

JP           H06-278007  A     10/1994
JP           H07-136904  A      5/1995
JP           H11-039020  A      2/1999
JP           2004-049731 A      2/2004
JP           2008-134903 A      6/2006
JP           2011-224696 A     11/2011
JP           2018-118340 A      8/2018
JP           2019-076978 A      5/2019
WO           2021246416 A1     12/2021
WO        WO2021246416       *  12/2021

* cited by examiner

Fig.2

TEACHING DEVICE, CONTROL DEVICE, AND MECHANICAL SYSTEM

RELATED APPLICATIONS

The present application is a National Phase of International Application No. PCT/JP2021/046883 filed Dec. 17, 2021.

TECHNICAL FIELD

The present invention relates to a robot system having a user interface for capturing an object with an autofocus camera, and a capturing method using the interface.

BACKGROUND ART

In order to intuitively generate an operation program for machines including a robot and a machine tool, etc., icon-based programming has been proposed in which an operation program is generated by arranging icons representing control commands for the machine. On the other hand, an already well-known technique involves performing force control based on a force acting on a control point of the machine determined from information detected by a force detector including a force sensor or a torque sensor, etc. When teaching the force control command, it is necessary to teach many parameters, such as a motion trajectory of the machine, an approach speed of the machine to a work target, the magnitude and direction of a force applied to the work target, a movement speed and a posture of the machine, etc.

As a method for teaching the motion trajectory of the machine, online teaching and offline teaching are well known. Online teaching includes playback teaching, in which the machine is actually moved using a teach pendant, etc., and the motion trajectory of the machine is recorded and played back, and direct teaching, in which the motion trajectory of the machine is recorded and taught while an operator directly moves a handle, etc., attached to or near a control target part of the machine. In the offline teaching, the motion trajectory of the machine is recorded and taught while a model of the machine is moved in a virtual space generated by a computer device.

As a teaching method for the force control, a method for specifying and teaching various parameters such as an approach speed to a work target including a workpiece and a tool, the magnitude and direction of a force applied to the work target, and a movement speed of the machine is well known. However, the teaching of the force control command entails the following problems. (1) During the force control, the number of teaching points constituting the motion trajectory of the machine increases, whereby it is troublesome to adjust the position and posture of the machine at each teaching point. (2) In the force control command, it is necessary to teach many parameters such as the approach speed of the machine to the work target, the magnitude and direction of the force applied to the work target, the movement speed and posture of the machine, etc. Therefore, when the operator has limited knowledge of the parameters (especially when the operator is a beginner), the teaching becomes difficult and takes time.

Further, (3) the parameters of the force control command cannot be taught intuitively, and knowledge relating to the coordinate system, etc., is required when setting the magnitude and direction of the force to be applied to the work target, making it inconvenient to use. In addition, (4) in adjusting the parameters of the taught force control command, the adjusted parameters are applied to all teaching points, and thus the magnitude and direction of the force cannot be flexibly adjusted for each teaching point. As prior art relating to the present application, for example, the documents mentioned below are known.

Patent Literature 1 describes that a motion trajectory of a machine is taught by direct teaching, playback is interrupted by pressing a teaching switch during the playback, and the trajectory after the interruption is re-taught.

Patent Literature 2 describes that a force control pressing device installed at a front end of a robot includes a moving mechanism unit, and a pressing direction of the force control pressing device is set. Further, it is described that the force control pressing device is provided with a force sensor to measure a force acting between a tool and a workpiece.

Patent Literature 3 discloses a teaching method in which a robot is directly taught, based on an output signal of a force sensor, and describes that, only while a teaching switch is on, is a hand moved according to an operation force applied to the force sensor by operator to obtain a good operating feeling and to improve positioning accuracy.

CITATION LIST

Patent Literature

[PTL 1] JP 2004-049731 A
[PTL 2] JP 2018-118340 A
[PTL 3] JP 1984(S59)-157715 A

SUMMARY OF THE INVENTION

Technical Problem

In view of the problems in the prior art, the object of the present invention is to provide a technique for facilitating the teaching of force control.

Solution to Problem

One aspect of the present disclosure provides a teaching device comprising a teaching unit configured to associate a force parameter of a force control command for a machine with a motion trajectory of the machine for performing force control, and simultaneously teach the force parameter and the motion trajectory, using a force detector.

Another aspect of the present disclosure provides a controller comprising: a teaching unit configured to associate a force parameter of a force control command for a machine with a motion trajectory of the machine for performing force control, and simultaneously teach the force parameter and the motion trajectory, using a force detector; a program generation unit configured to generate a motion program for the machine based on the force control command; and a control unit configured to operate the machine according to the motion program and perform a force control for the machine.

Further aspect of the present disclosure provides a machine system comprising: a machine having a force detector; a teaching unit configured to associate a force parameter of a force control command for the machine with a motion trajectory of the machine for performing force control, and simultaneously teach the force parameter and the motion trajectory, using the force detector; a program generation unit configured to generate a motion program for the machine based on the force control command; and a control unit configured to operate the machine according to the motion program and perform a force control for the machine.

Advantageous Effect of the Invention

According to the present disclosure, manual focus adjustment becomes unnecessary, and variations in focus position which may occur when using the program for capturing with the autofocus camera under different conditions can be eliminated or reduced. Furthermore, by using the second capture mode which does not use the autofocus function, the focusing operations of the camera can be reduced, whereby the life of the camera can be extended.

BRIEF DESCRIPTION OF DRAWINGS

FIG. 2 is a functional block diagram of the mechanical system of the first embodiment.

DESCRIPTION OF EMBODIMENTS

Figure 1:
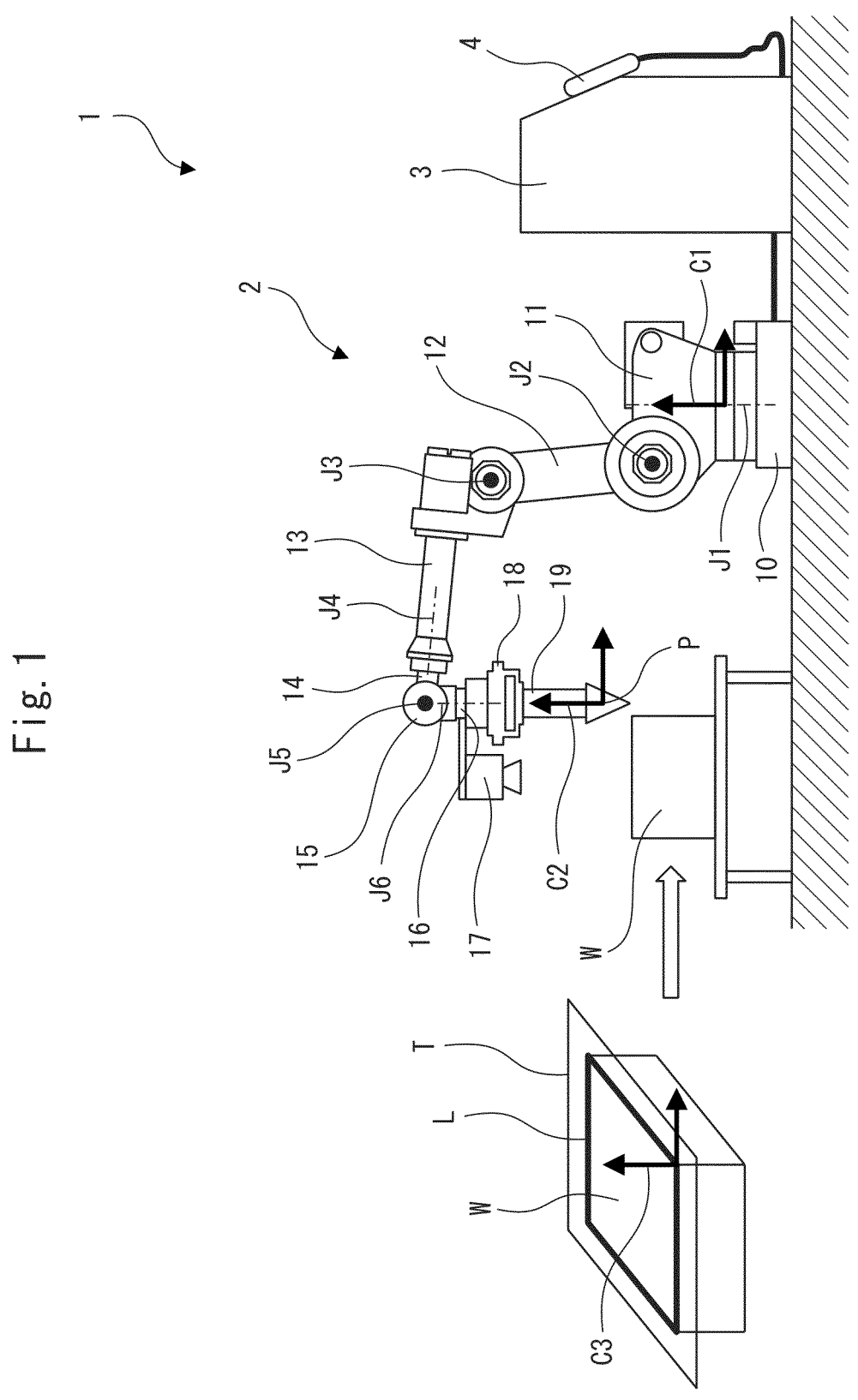
FIG. 1 is a configuration view of a mechanical system of a first embodiment.

The embodiments of the present disclosure will be described in detail below with reference to the attached drawings. In the drawings, identical or similar constituent elements have been assigned the same or similar reference signs. Furthermore, the embodiments described below do not limit the technical scope of the invention described in the claims or the definitions of the terms. In this document, the term "force parameter" includes the magnitude and direction of a force applied to a work target, and the term "motion trajectory" includes at least the position of a teaching point. Further, in this document, the term "display" refers to all or a partial area of a screen of one or more display devices, and the term "window" refers to a partial area of the display.

Hereinafter, a mechanical system 1 of according to a first embodiment will be explained. FIG. 1 is a configuration view of the mechanical system 1 of the first embodiment. The mechanical system 1 includes a machine 2, a controller 3 configured to control the motion of the machine 2, and a teaching device 4 configured to teach the motion of the machine 2.

The machine 2 may be configured by an articulated robot, but is not limited thereto, and in other embodiments may be configured by another industrial robot such as a single-joint robot, a parallel link robot, or a dual-arm robot, etc. Further, in another embodiment, the machine 2 may be configured not by an industrial robot, but by other types such as a humanoid robot. Alternatively, in still another embodiment, the machine 2 is not a robot, but may be configured by another industrial machine such as a machine tool, a construction machine, an agricultural machine, or other types of machines such as a vehicle, an aircraft, or a rocket, etc.

The machine 2 includes one or more links 10 to 16 connected to each other. The links 11 to 16 are configured as rotary links configured to rotate around the axes J1 to J6, respectively, but are not limited thereto, and in other embodiments, they may be linear links configured to move linearly along the axes J1 to J6. The zero-th link 10 is, for example, a base fixed at a predetermined position, and the first link 11 is, for example, a rotating body supported rotatably relative to the zero-th link 10 about the first axis J1. The second link 12 is, for example, an upper arm supported rotatably relative to the first link 11 about the second axis J2 perpendicular to the first axis J1, and the third link 13 is, for example, a forearm supported rotatably relative to the second link 12 about the third axis J3 parallel to the second axis J2.

The fourth to six links 14 to 16 correspond to a wrist having three axes. The fourth link 14 is, for example, a first wrist element supported rotatably relative to the third link 13 about the fourth axis J4 perpendicular to the third axis J3. The fifth link 15 is, for example, a second wrist element supported rotatably relative to the fourth link 14 about the fifth axis J5 perpendicular to the fourth axis J4, and the sixth link 16 is, for example, a third wrist element supported rotatably relative to the fifth link 15 about the sixth axis J6 perpendicular to the fifth axis J5.

Although not essential, the machine 2 may include a vision sensor 17 configured to capture an image of a workspace in which a work target W including a workpiece or a tool is present. The vision sensor 17 may be configured by a two-dimensional camera, but is not limited thereto, and may be configured by a three-dimensional camera in other embodiments. The controller 3 or the teaching device 4 may obtain parameters such as the machining result of the work target W and the position and posture of the machine 2, from information detected by the vision sensor 17.

The machine 2 further includes a force detector 18 attached near a control point P of the machine 2 (in this embodiment, between the wrist and a tool 19). The force detector 18 is configured by a force sensor configured to detect a force in three axial directions and moments about three axes, but is not limited thereto, and in other embodiments, may be configured by a force sensor configured to detect a force in at least one axis. Alternatively, in another embodiment, the force detector 18 is not configured by a force sensor attached to the wrist, but may be configured by one or more torque sensors provided at the connection part of the first link 11 to the sixth link 16. The torque sensor detects the torque acting on the first link 11 to the sixth link 16. The controller 3 or the teaching device 4 determines the magnitude and acting direction of the force applied to the work target W (i.e., force parameters) from the detection information of the force detector 18.

The machine 2 further includes the tool 19 attached to a front end of the machine 2. In this embodiment, the tool 19 is configured by a deburring tool for deburring the work target W, but is not limited thereto, and in other embodiments, may be configured by other types of tools such as a hand tool, a welding tool, a screw fastening tool, a cutting tool, a polishing tool, or a hemming tool, etc. The machine 2 of the embodiment performs deburring work by pressing the deburring tool along a processing line L of the work target W, but is not limited thereto. In other embodiments, the machine 2 may perform a deburring process in which the work target W held by the hand tool is pressed against a tool such as a deburring tool or a polishing tool, or a fitting process in which a convex workpiece held by the hand tool is fitted into a concave workpiece, or a face-to-face process in which a surface of a first workpiece held by the hand tool is brought into contact with a surface of a second workpiece, or a phasing process in which a first gear held by the hand tool is aligned with a second gear, or a screw fastening process in which a male screw held by the hand tool is fastened to a female screw.

Figure 2:
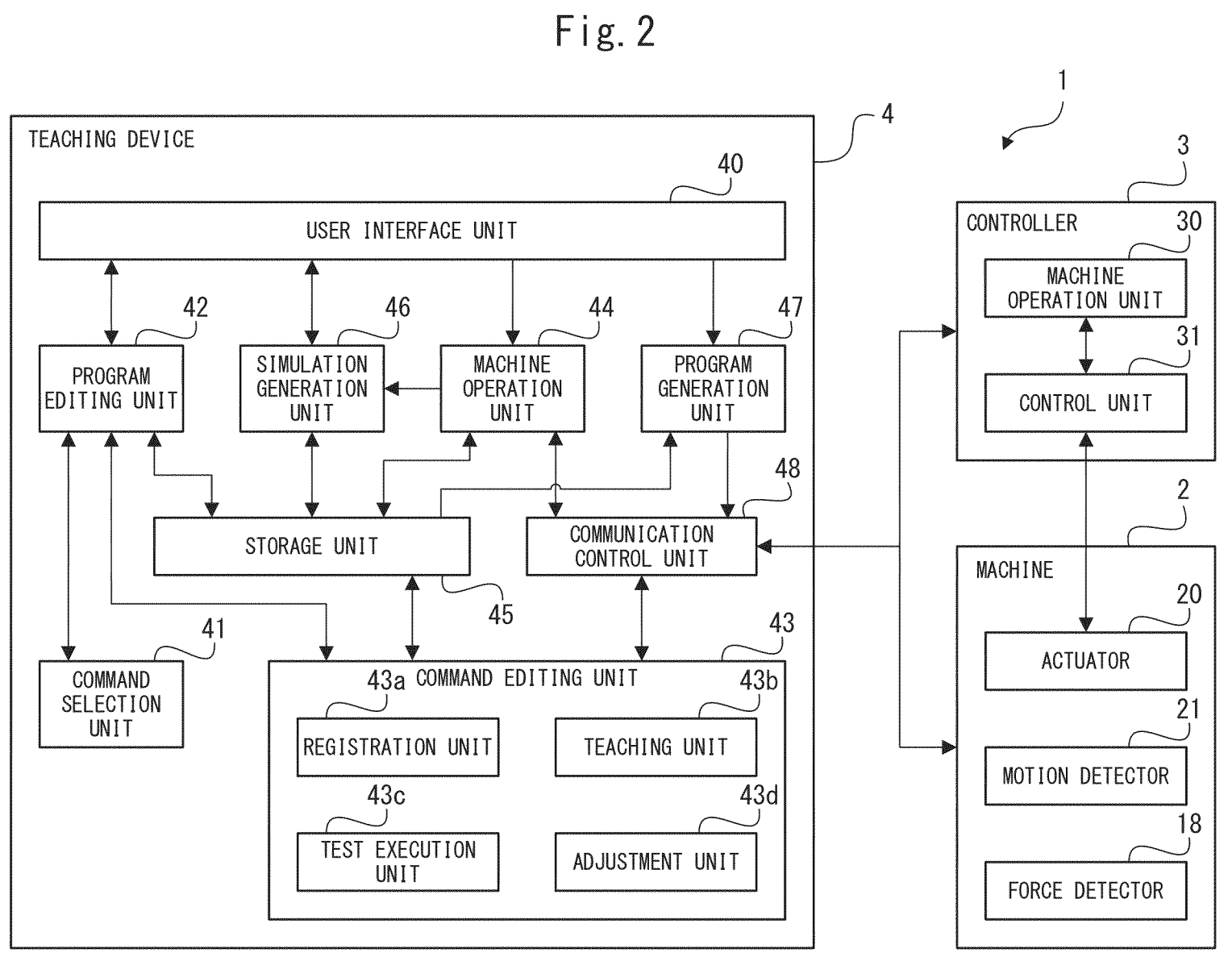

The machine 2 includes one or more actuators 20 configured to drive the links 11 to 16 and one or more motion detectors 21 configured to detect the motion of the actuators 20 (see FIG. 2). The actuator 20 is arranged near the connecting part of the links 11 to 16. The actuator 20 is configured by an electric actuator including an electric motor and a speed reducer, etc., but is not limited thereto, and in other embodiments, may be configured by other types of actuators such as a hydraulic type and a pneumatic type. The motion detector 21 is configured by an encoder, but is not limited thereto, and in other embodiments, may be configured by other types of motion detector such as a resolver or a Hall sensor, etc. The controller 3 or the teaching device 4 may obtain parameters such as the position and posture of the machine 2, the movement speed of the machine 2, and the approach speed of the machine 2 to the work target W, from the detection information of the motion detector 21.

The controller 3 includes a programmable logic controller (PLC), etc., but is not limited thereto, and in other embodiments, may be configured by another type of computer including a processor, memory, input/output interface, etc., which are connected to each other via a bus. The control device 3 further includes a drive circuit configured to drive the actuator 20, but is not limited thereto, and in other embodiments, the machine 2 may include a drive circuit configured to drive the actuator 20. The controller 3 drives the actuator 20 and controls the machine 2. The controller 3 receives detection information from the motion detector 21 and the force detector 18, and the teaching device 4 receives the detection information of the motion detector 21 and the force detector 18 from the control device 3. However, the present disclosure is not limited thereto, and in other embodiments, the teaching device 4 may directly receive the detection information from the motion detector 21 and the force detector 18.

The controller 3 may set various coordinate systems such as a world coordinate system, a machine coordinate system, a flange coordinate system, a tool coordinate system, a camera coordinate system, and a user coordinate system, etc. These coordinate systems are configured, for example, by orthogonal coordinate systems. For ease of explanation, it is assumed that the controller 3 sets a machine coordinate system C1, a tool coordinate system C2, and a user coordinate system C3. The machine coordinate system C1 is fixed at a reference position of the machine 2, e.g. the base, the tool coordinate system C2 is fixed at a reference position of the tool 19, e.g. a tool center point (TCP), and the user coordinate system C3 is fixed at an arbitrary position, e.g. a reference position of the work target W.

The controller 3 sets the control point P of the machine 2 to the origin of the tool coordinate system C2 (i.e., the tool center point: TCP). Therefore, the position and posture of a control target part (tool in this example) of the machine 2 (hereinafter referred to as the position and posture of the machine 2) are represented as the position and orientation of the tool coordinate system C2 in the machine coordinate system C1. In other embodiments, the position and posture of the machine 2 may be represented as the position and orientation of the flange coordinate system in the machine coordinate system C1, or, as the position and orientation of the tool coordinate system C2 or the flange coordinate system in the user coordinate system C3. The controller 3 controls the motion of the machine 2 according to the operation program generated by the teaching device 4.

The operation program includes a movement command for moving the control point P of the machine 2 to a teaching point constituting the motion trajectory T of the machine 2, a force control command for controlling the force applied to the work target W, an application command for causing the machine 2 to execute a predetermined motion pattern (palletizing and depalletizing, etc.), a conditional branch command for branching the control command under a predetermined condition, and a loop command for looping the control command under a predetermined condition.

The teaching device 4 is configured by a portable teach pendant connected to the controller 3 by wire or wirelessly, but is not limited thereto, and in other embodiments, may be configured by another type of device such as a computer device including a teaching operation panel directly assembled to the controller 3, a tablet, or a personal computer. The teaching device 4 includes a processor, memory, input/output interface, and a user interface, etc. which are connected to each other via a bus. The user interface is configured by a display device such as a touch panel or a display, and an input device such as a keyboard, buttons, or switches. The teaching device 4 is connected to the controller 3 by wire or wirelessly.

The teaching device 4 includes program generation software for generating the operation program for the machine 2. The program generation software is configured by an icon-based program generation software configured to generate the operation program by arranging icons representing the control commands for the machine 2, but is not limited thereto, and in other embodiments, may be configured by a text-based program generation software configured to generate the operation program by arranging texts representing the control commands for the machine 2. The teaching device 4 transmits the generated operation program to the controller 3.

In the mechanical system 1 configured as described above, the controller 3 operates the machine 2 according to the operation program to perform the force control for the machine 2, and the machine 2 uses the tool 19 to perform, for example, deburring the work target W. In teaching the force control command, it is necessary to teach many parameters such as the motion trajectory T of the machine 2, the approach speed of the machine 2 to the work target W, the magnitude and direction of the force applied to the work target, the movement speed of the machine 2, and the posture of the machine 2, etc.

As the teaching method of the motion trajectory T of the machine 2, online teaching such as playback teaching or direct teaching, or offline teaching may be used. In the playback teaching, the machine 2 is actually moved by the teaching device 4 such as a teach operation panel or a teach pendant so that the motion trajectory of the machine 2 is taught by recording and reproducing the motion trajectory. In the direct teaching, the motion trajectory of the machine 2 is recorded and taught during the operator directly moves a handle, etc., attached to or near the control target part of the machine 2. In the offline teaching, the motion trajectory of the machine 2 is recorded and taught during a model of the machine 2 is moved in a vertical space generated by the teaching device 4.

As the teaching method of the force control, a method of specifying and teaching various parameters such as the approach speed to the work target W, the magnitude and direction of the force applied to the work target W, and the movement speed of the machine, may be used. However, such a method includes the following problems. (1) During the force control, the number of teaching points constituting the motion trajectory of the machine 2 increases, whereby it is troublesome to adjust the position and posture of the machine 2 at each teaching point. (2) In the force control command, it is necessary to teach many parameters such as the approach speed of the machine to the work target, the magnitude and direction of the force applied to the work target, the movement speed and posture of the machine, etc. Therefore, when the operator has limited knowledge of the parameters (especially when the operator is a beginner), the teaching becomes difficult and takes time.

Further, (3) the parameters of the force control command cannot be taught intuitively, and knowledge relating to the coordinate system, etc., is required when setting the magnitude and direction of the force to be applied to the work target, making it inconvenient to use. In addition, (4) in adjusting the parameters of the taught force control command, the adjusted parameters are applied to all teaching points, and thus the magnitude and direction of the force cannot be flexibly adjusted for each teaching point.

Therefore, in the first embodiment, using the force detector 18, the force parameters of the force control command for the machine 2 and the motion trajectory T of the machine 2 for performing the force control are associated and taught at the same time. This teaching is performed by recording the force parameters in association with the motion trajectory T by direct teaching or playback teaching. Further, other parameters other than the force parameter and the motion trajectory (such as the approach speed of the machine 2 to the work target W, the movement speed of the machine 2, the posture of the machine 2, etc.) may also be taught simultaneously.

Hereinafter, functional blocks of the mechanical system 1 of the first embodiment will be explained. FIG. 2 is a functional block diagram of the mechanical system 1 of the first embodiment. The teaching device 4 includes a user interface (UI) unit 40, a storage unit 45, and a communication control unit 48. The UI unit 40 is configured by hardware such as a touch panel, display, keyboard, buttons, and switches, etc. The storage unit 45 is configured by a memory such as a RAM (random access memory), a ROM (read only memory), and an SSD (solid state drive), etc. The communication control unit 48 is configured by hardware such as a semiconductor integrated circuit, etc.

The teaching device 4 further includes a command selection unit 41, a program editing unit 42, and a command editing unit 43. Although not essential, the teaching device 4 may further include a simulation generation unit 46, a machine operation unit 44, and a program generation unit 47. These "units" are configured by one or more programs or program sections which constitute the program generation software. The program generation software is read and executed by a processor such as a PLC (programmable logic controller), a CPU (central processing unit), or an MPU (micro processing unit), etc.

The UI unit 40 displays and inputs various information. The command selection unit 41 selects various control commands based on the operation information which is input through the UI unit 40. The program editing unit 42 arranges the control commands in chronological order based on the operation information which is input through the UI unit 40, and edits the operation program of the machine 2.

The command editing unit 43 edits each control command based on the operation information which is input through the UI unit 40.

The simulation generation unit 46 places a model of the machine 2 in the virtual space, and generates a simulation of the motion of the machine 2. The simulation generation unit 46 may also generate the motion trajectory of the machine 2 and various coordinate axes. The machine operation unit 44 operates and moves the model of the machine 2 placed in the virtual space based on the operation information which is input through the UI unit 40. The machine operating unit 44 may also generate the motion trajectory of the machine 2.

The storage unit 45 stores various information such as the operating program and the parameters. The program generation unit 47 converts the edited operation program into source code, object code (machine language), intermediate code, byte code, etc., and generates the operation program. The program generation unit 47 executes the generated operation program online or offline. The communication control unit 48 controls communication of various information such as the operation program, the control command, the parameters, and detection information of the force detector 18 and the motion detector 21, with the machine 2 or the control device 3.

The controller 3 includes a mechanical operation unit 30 and a control unit 31. The machine operation unit 30 is configured by a teaching operation panel, and includes a movement button and a posture change button, etc., for operating the machine 2. The control unit 31 is configured by a program or program sections which can be executed by the PLC or the other processor. The machine operation unit 30 operates the machine 2 based on the operation information to actually move the machine 2. The control unit 31 drives and controls the actuator 20 to move the machine 2 according to the operation program, the control command, the operation information, etc.

The machine 2 includes one or more actuators 20, one or more motion detectors 21, and one or more force detectors 18. The actuator 20 drives the links 11 to 16 of the machine 2 according to the operation command (the position command, the speed command, and the current command) from the control unit 31. The motion detector 21 detects the motion (the position, the velocity, and the acceleration) of the actuator 20. The force detector 18 detects the force acting on the front end of the machine 2, but is not limited thereto, and in other embodiments, detects the torque acting on the links 11 to 16.

The command editing unit 43 includes a registration unit 43a, a teaching unit 43b, a test execution unit 43c and an adjustment unit 43d, as functions for editing the force control command. The registration unit 43a, the teaching unit 43b, the test execution unit 43c and the adjustment unit 43d are configure by one or more programs or program sections which constitute the program generation software.

The registration unit 43a previously registers other parameters other than the force parameter of the force control command and the motion trajectory T of the machine 2, as initial values. The other parameters include the approach speed of the machine 2 to the work target W, the movement speed of the machine 2, and the posture of the machine 2, etc.

The teaching unit 43b uses the force detector 18 to associate the force parameter of the force control command with the motion trajectory T of the machine 2 for performing the force control, and simultaneously teaches them. The teaching unit 43b includes a teaching start command for starting recording of the teaching, and a teaching end command for ending the recording of the teaching. When the teaching unit 43b starts the recording of the teaching, the recording of the force parameter, the motion trajectory T and parameters other than these is started by direct teaching or playback teaching. When the teaching unit 43b ends the recording the teaching, the recording of the force parameter, the motion trajectory T and the parameters other than these is terminated.

When the teaching is performed by direct teaching, during the operator directly moves the handle, etc., attached to or near the control target part of the machine 2 so that the tool 19 is moved while being pressed against the work target W, the teaching unit 43b obtains the detection information of the force detector 18 from the controller 3 or the machine 2, calculates the magnitude and the acting direction of the force to be applied to the work target W from the detected information, calculates the motion trajectory T of the machine 2 based on the current position of the machine 2 piece and the acting direction of the force, associates the force parameter with the motion trajectory T, and records the associated force parameter and the motion trajectory in the storage unit 45.

Alternatively, the motion trajectory T of the machine 2 may be determined using the motion detector 21 or the vision sensor 17, although this differs from the spirit of the present application. In other words, the teaching unit 43b may determine the motion trajectory T of the machine 2 based on forward kinematics based on the detection information of the motion detector 21, or may geometrically determine the motion trajectory of the machine 2 based on the detection information of the visual sensor 17 which captures three or more reference points whose relative positions are known.

When the teaching is performed by playback teaching, during the operator actually moves the machine 2 by the machine operation unit 30 so that the tool 19 is moved while being pressed against the work target W, the teaching unit 43b obtains the detection information of the force detector 18 from the controller 3 or the machine 2, calculates the magnitude and the acting direction of the force to be applied to the work target W from the detected information, calculates the motion trajectory T of the machine 2 based on the current position of the machine 2 piece and the acting direction of the force, associates the force parameter with the motion trajectory T, and records the associated force parameter and the motion trajectory in the storage unit 45.

Alternatively, the motion trajectory T of the machine 2 may be determined from the actual amount of movement of the machine 2 by the machine operation unit 30, or from the amount of movement of the model of the machine 2 by the machine operation unit 44.

As described above, the teaching unit 43b uses the force detector 18 to associate the force parameter of the force control command with the motion trajectory T of the machine 2 for performing the force control and simultaneously teaches them, and thus the even the force control command which tends to require many teaching points can be easily taught. In particular, when the teaching is performed by direct teaching, the force parameter and the motion trajectory T can be taught intuitively, the operator does not need to have knowledge of coordinate systems, etc., and the effort required for teaching is reduced.

The teaching unit 43b associates force parameter with the motion trajectory T and stores the force parameter, for each teaching point constituting the motion trajectory T, or for each predetermined motion section constituting the motion trajectory T, or for each predetermined time interval during the motion. When associating the force parameters with the motion trajectory T for each teaching point, the operator can flexibly adjust the force parameters for each teaching point. When associating the force parameters with the motion trajectory T for each predetermined motion section or for each predetermined time interval, the operator can collectively adjust the force parameters for each predetermined motion section or for each predetermined time interval.

The teaching unit 43b may switch the interval at which the force parameter is associated with the motion trajectory T (for each teaching point, for each predetermined motion section, or for each predetermined time interval) based on the operation information which is input through the UI unit 40. By switching the interval at which the force parameter is associated with the motion trajectory T, the force parameter can be adjusted more flexibly, and the work efficiency of the teaching of the force control command is improved.

The teaching unit 43b may simultaneously teach the force parameter and the other parameters other than the motion trajectory T, by using the force detector 18. The other parameters include the approach speed of the machine 2 to the work target W, the movement speed of the machine 2, and the posture of the machine 2, etc. The other parameters are simultaneously taught by direct teaching or playback teaching. By simultaneously teaching the force parameter and the other parameters other than the motion trajectory T, the force control command can be taught more easily.

Alternatively, although this differs from the spirit of the present application, in the case of direct teaching, the other parameters such as the approach speed of the machine 2, the movement speed of the machine 2, and the posture of the machine 2, etc., may be taught using the motion detector 21 or the visual sensor 17. In addition, in the case of playback teaching, the other parameters such as the approach speed of the machine 2, the movement speed of the machine 2, and the posture of the machine 2, etc., may be determined by the actual amount of movement of the machine 2 by the machine operation unit 30 or the amount of movement of the model of the machine 2 by the machine operation unit 44.

The test execution unit 43c executes a test of the taught force control command. The taught force control command is tested online or offline. When executing the test online, the test execution unit 43c sends the force control command to the control unit 31 via the communication control unit 48, and the control unit 31 drives the actuator 20 of the machine 2 according to the force control command so as to actually operate the machine 2 and perform the force control for the machine 2. The operator checks a result of the test (a result processing, the motion trajectory T of machine 2, a cycle time, etc.), and if there are no problems with the result of the test, completes the teaching of the force control command, otherwise, if there are problems with the result of the test, adjusts the teaching of the force control command.

When executing the test offline, the test execution unit 43c sends the force control command to the simulation generation unit 46, and the simulation generation unit 46 operates the model of the machine 2 in virtual space according to the force control command to perform the force control for the machine 2. In the offline test execution, the operator cannot check the result of processing, but can check the motion trajectory of the machine 2 and a cycle time, etc. If there is no problem with the result of the test, the teaching of the force control command is completed, otherwise, if there is a problem with the result of the test, the teaching of the force control command is adjusted.

The adjustment unit 43*d* manually or automatically adjusts the force parameter, the motion trajectory and the other parameters to be adjusted. In the case of manual adjustment, the adjustment unit 43*d* manually adjusts various parameters for each teaching point, for each predetermined motion section, or for each predetermined time interval based on the operation information which is input through the UI unit 40. In the case of automatic adjustment, the adjustment unit 43*d* automatically adjusts various parameters for each teaching point, for each predetermined motion section, or for each predetermined time interval by direct teaching or playback teaching.

When reteaching one teaching point by direct teaching, after the control unit 31 moves the control point P of the machine 2 to a predetermined teaching point, during the operator directly moves the handle, etc., attached to or near the control target part of the machine 2 and presses the tool 19 against the work target piece W, the adjustment unit 43*d* obtains the detection information of the force detector 18 from the controller 3 or the machine 2, and perform the reteaching by recording the force parameter determined from the detection information.

When reteaching a plurality of teaching points constituting a predetermined motion section or a predetermined time interval by direct teaching, after the control unit 31 moves the control point P of the machine 2 to a starting point among the plurality of teaching points, during the operator directly moves the handle, etc., attached to or near the control target part of the machine 2 and presses the tool 19 against the work target piece W, the adjustment unit 43*d* obtains the detection information of the force detector 18 from the controller 3 or the machine 2, and perform the reteaching by recording the force parameter, the motion trajectory T and the other parameters determined from the detection information. In addition, the motion trajectory T and the other parameters may be retaught by using the motion detector 21 or the visual sensor 17.

When reteaching one teaching point by playback teaching, after the control unit 31 moves the control point P of the machine 2 to a predetermined teaching point, during the operator directly moves the machine 2 by the machine operation unit 30 and presses the tool 19 against the work target piece W, the adjustment unit 43*d* obtains the detection information of the force detector 18 from the controller 3 or the machine 2, and perform the reteaching by recording the force parameter determined from the detection information.

When reteaching a plurality of teaching points constituting a predetermined motion section or a predetermined time interval by playback teaching, after the control unit 31 moves the control point P of the machine 2 to a starting point among the plurality of teaching points, during the operator directly moves the machine 2 by the machine operation unit 30 and presses the tool 19 against the work target piece W, the adjustment unit 43*d* obtains the detection information of the force detector 18 from the controller 3 or the machine 2, and perform the reteaching by recording the force parameter, the motion trajectory T and the other parameters determined from the detection information. In addition, the motion trajectory T and the other parameters may be retaught by using the machine operation unit 30 or the machine operation unit 44.

The test execution unit 43*c* executes a test of the adjusted force control command again. The adjusted force control command is tested online or offline. The operator checks a result of the test (a result processing, the motion trajectory T of machine 2, a cycle time, etc.), and if there are no problems with the result of the test, completes the teaching of the force control command, otherwise, if there are problems with the result of the test, readjusts the teaching of the force control command.

After the teaching of the force control teaching is completed, the program generation unit 47 generates a motion program for the machine 2 based on the taught force control command. The program generation unit 47 sends the generated motion program to the control unit 31, and the control unit 31 operates the machine 2 according to the motion program to perform the force control for the machine 2.

Figure 3:
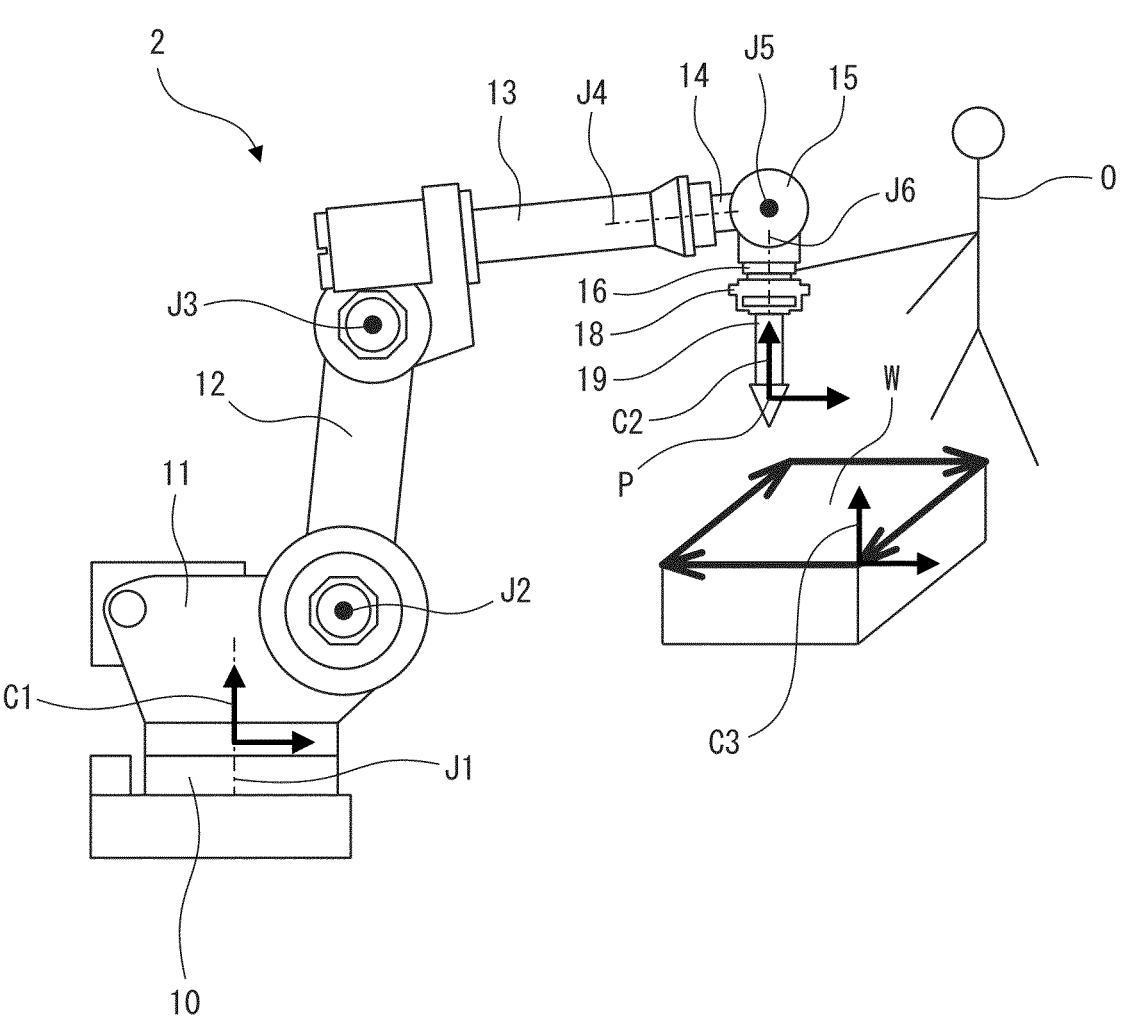
FIG. 3 is an explanatory view of showing an example of a force control teaching method.
Figure 4:
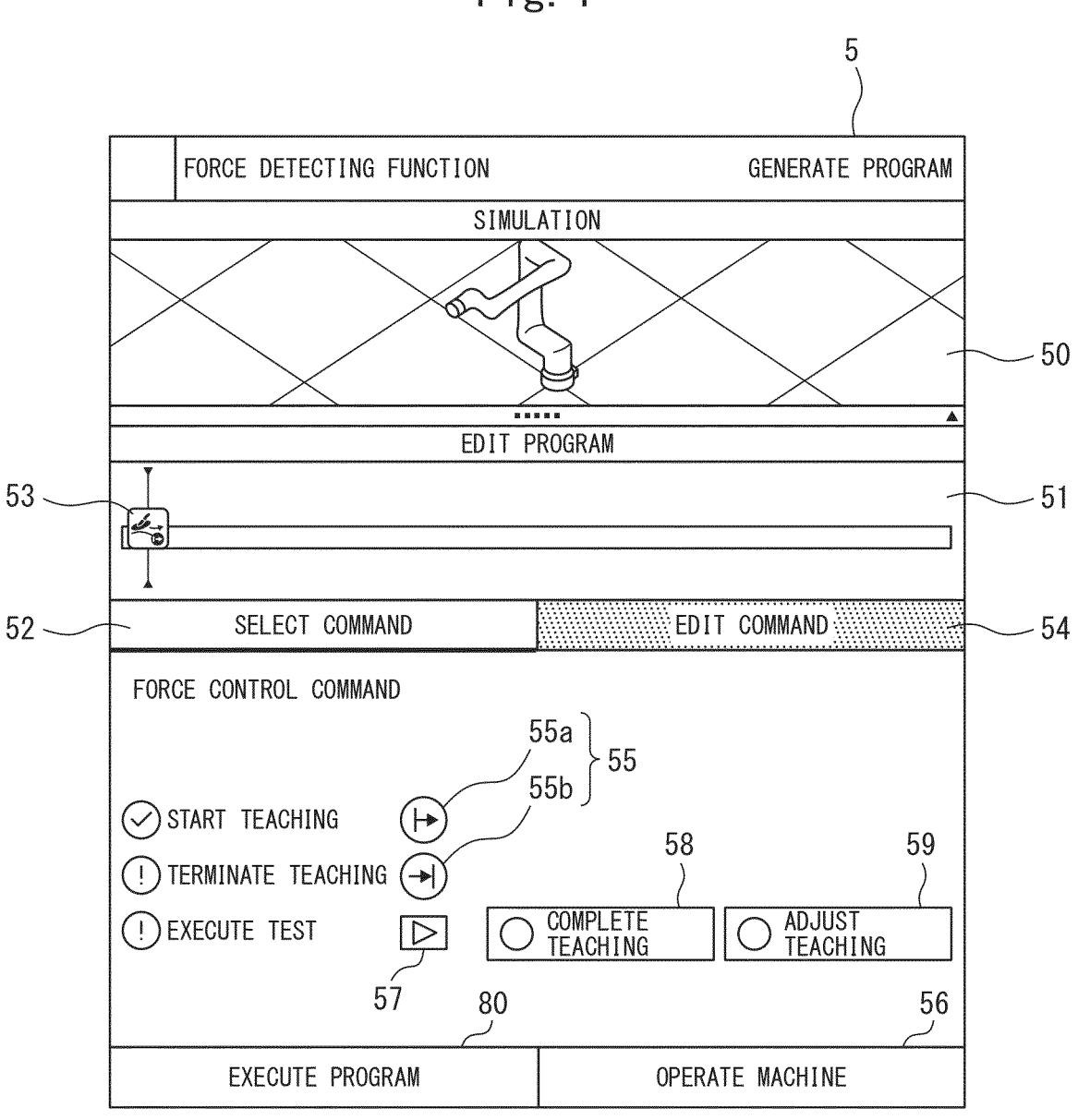
FIG. 4 is a view showing an example of a force control program generation display.
Figure 5:
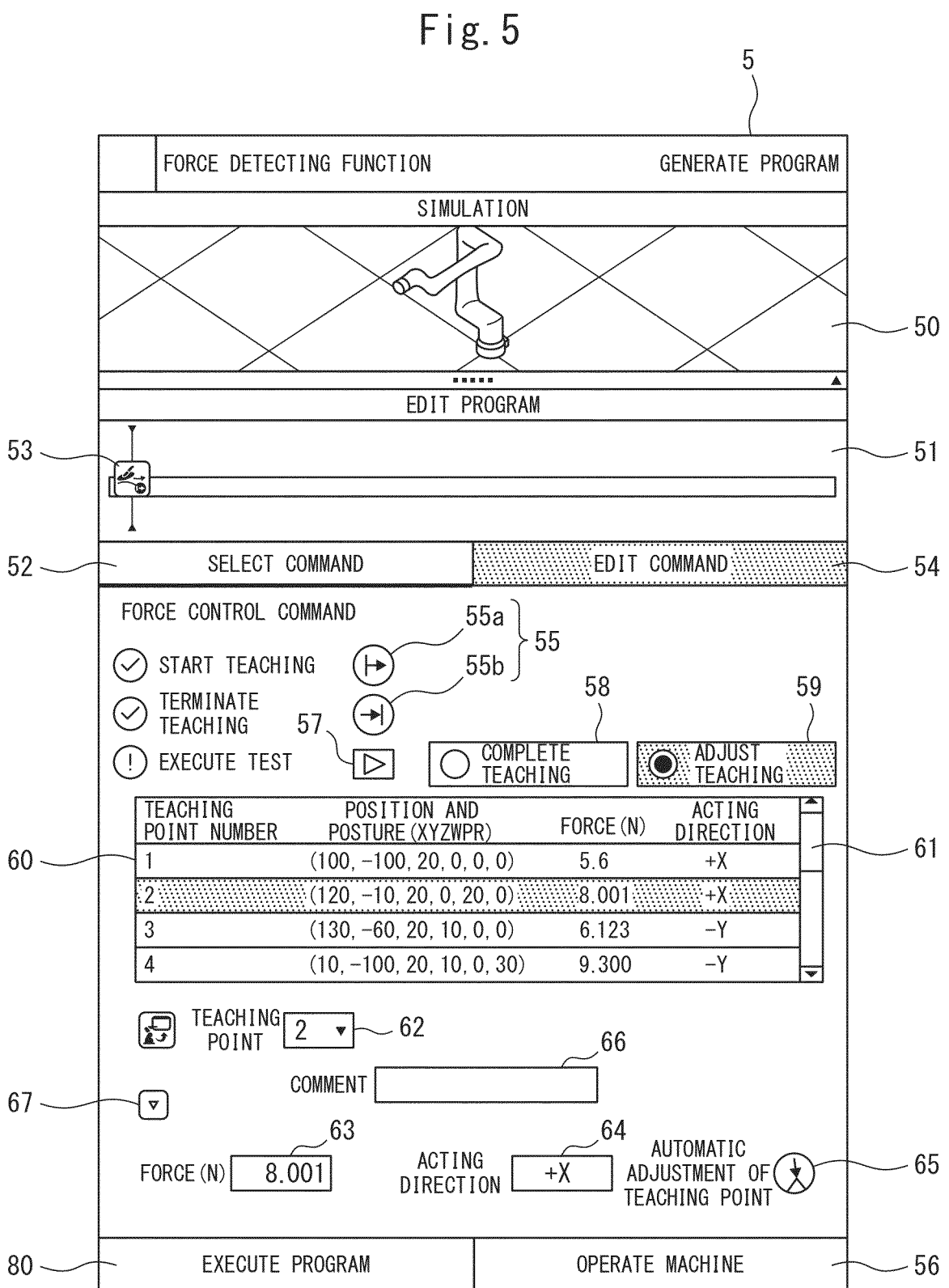
FIG. 5 is a view showing an example of a force control program generation display.
Figure 6:
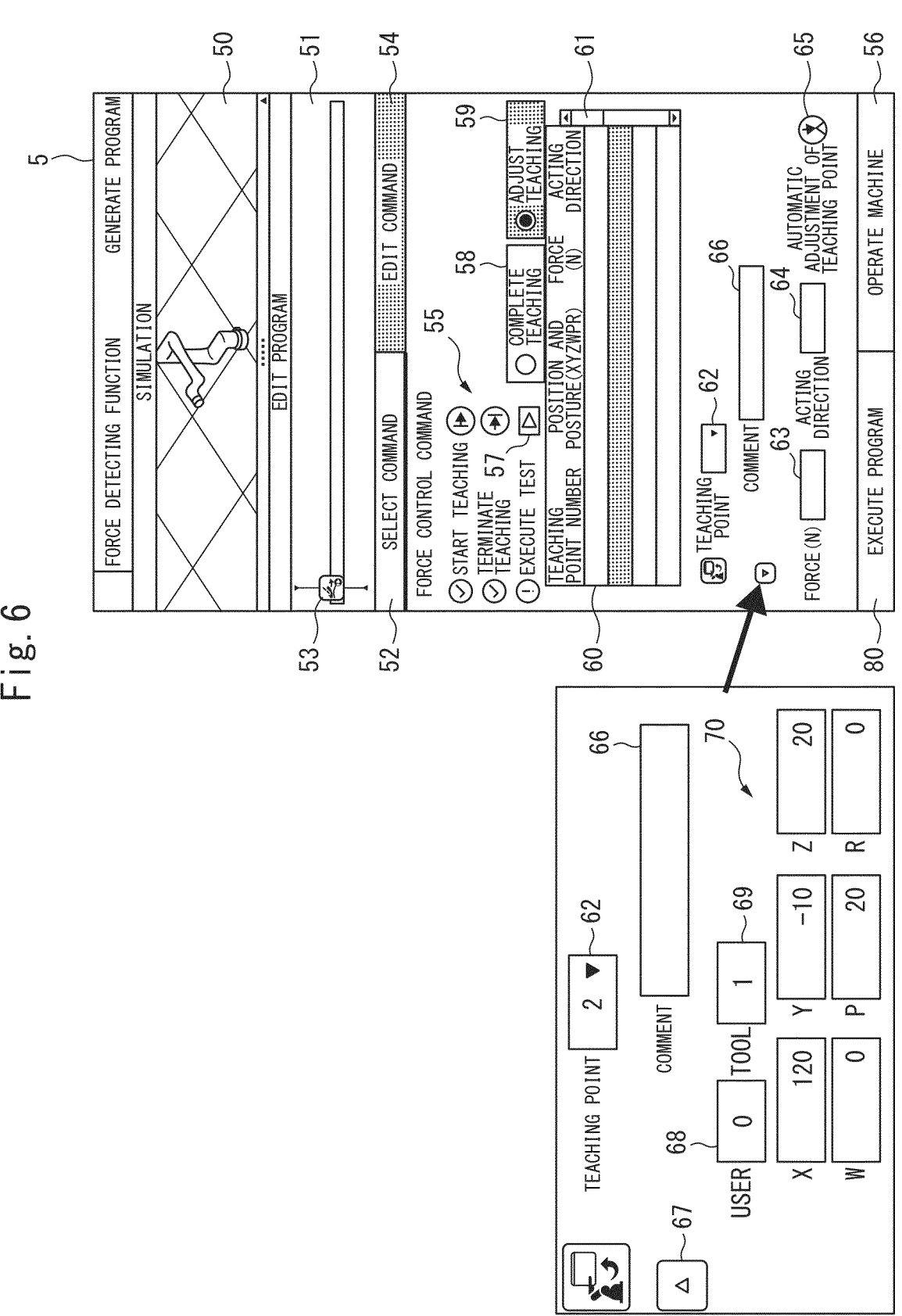
FIG. 6 is a view showing an example of a force control program generation display.

Hereinafter, a teaching method for the force control and an example of a program generation display will be explained. FIG. 3 is an explanatory view illustrating an example of a teaching method for the force control, and FIGS. 4 to 6 show examples of a program generation display 5 for the force control. It should be noted that FIG. 6 is a partially reduced and partially enlarged view of the program generation display 5 in FIG. 5, and in FIG. 6, some characters written on the program generation display 5 in FIG. 5 are omitted. In this example, as shown in FIG. 3, it is assumed that the operator O simultaneously teaches the force parameters of the force control command, the motion trajectory of the machine 2, and the other parameters by direct teaching using the force detector 18.

The teacher O starts program generation software for generating the motion program for the machine 2 using the teaching device 4. As shown in FIG. 4, the program generation software displays the program generation display 5 on the UI unit 40. The program generation display 5 includes a command selection window 52, a program editing window 51, and a command editing window 54. Although not shown, the command selection window 52 is displayed on the program generation display 5 by the command selection unit 41. The program editing window 51 is displayed on the program generation display 5 by the program editing unit 42. The command editing window 54 is displayed on the program generation display 5 by the command editing unit 43.

Although not essential, the program generation display 5 may include a simulation window 50, a machine operation window 56, and a program execution window 80. The simulation window 50 is displayed on the program generation display 5 by the simulation generation unit 46. Although not shown, the machine operation window 56 is displayed on the program generation display 5 by the machine operation unit 44. Although not shown, the program execution window 80 is displayed on the program generation display 5 by the program generation unit 47.

The command selection window 52 displays various selectable control commands. The operator O selects an icon 53 representing the force control command from among various control commands on the command selection window 52, and locates the icon 53 on the program editing window 51. In another example, the operator O may select a text representing the force control command from among various control commands on the command selection window 52, and locate the text on the program editing window 51.

The program editing window 51 displays the motion program in which the locations of various control commands can be edited. The operator O selects the icon 53 representing the force control command on the program editing window 51, and displays the command editing window 54. In another example, the operator O may select a text representing the force control command on program edit window 51 and display the command edit window 54.

The command editing window 54 includes various editing functions for the control command selected on the program editing window 51. The command editing window 54 displays a teaching function, a test execution function and a teaching adjustment function, as the editing functions for the force control command. Further, the command editing window 54 may display a registration function as the editing function for the force control command. The teaching function is displayed on the instruction editing window 54 by the teaching unit 43*b*. The test execution function is displayed on the command editing window 54 by the test execution unit 43*c*. The teaching adjustment function is displayed on the command editing window 54 by the adjustment unit 43*d*. The registration function is displayed on the command editing window 54 by the registration unit 43*a*.

The teaching function has teaching buttons 55 for starting or ending the teaching of the force control command. The teaching buttons 55 include a teaching start button 55*a* for starting recording of the teaching, and a teaching end button 55*b* for ending the recording of the teaching. When the teaching is performed by direct teaching, the operator O presses the teaching start button 55*a*, and then holds the wrist of the machine 2 and presses the tool 19 against the work target W and moves the tool 19, as shown in FIG. 3. When the teaching is performed by playback teaching, the operator O operates the machine 2 using the machine operation unit 30 to press the tool 19 against the work target W and move the tool 19, as shown in FIG. 2.

During the machine 2 is being moved, the detection information of the force detector 18 is obtained, and the force parameter of the force control command is associated with the motion trajectory of the machine 2 and is stored simultaneously. Further, the force parameter and the parameters other than the motion trajectory (the approach speed of the machine 2 to the workpiece W, the movement speed of the machine 2, and the posture of the machine 2, etc.) are also stored simultaneously. The operator O presses the teaching end button 55*b* to end the teaching of the force control command.

The test execution function includes a test execution button 57 for testing the taught force control command. The operator O presses the test execution button 57 to execute a text of the taught force control command. When executing the test online, the controller 3 actually operates the machine 2 according to the force control command to perform the force control for the machine 2. The operator O checks a result of the test (a result of processing, the motion trajectory of the machine 2, and a cycle time, etc.).

When executing the test offline, the simulation generation unit 46 operates the model of the machine 2 in the virtual space on the simulation window 50 in accordance with the force control command, and perform the force control for the machine 2. The operator O cannot check the result of processing, but can check the motion trajectory of the machine 2 and the cycle time, etc. Although not essential, the simulation window 50 may display the motion trajectory of the machine 2, the teaching points constituting the motion trajectory, various coordinate systems, and the work target W, etc.

The teaching adjustment function includes a teaching completion option button 58 for selecting the teaching completion of the force control command, and a teaching adjustment option button 59 for selecting the teaching adjustment of the force control command. When the test result of the force control command is satisfactory, the operator O selects the teaching completion option button 58 to complete the teaching of the force control command. On the other hand, when there is a problem with the test result of the force control command, the operator O selects the teaching adjustment option button 59 to adjust the teaching of the force control command.

As shown in FIG. 5, the teaching adjustment function has a trajectory history table 60 which includes a trajectory history of the taught force control command, and a trajectory history scroll bar 61 which scrolls the trajectory history of the trajectory history table 60. When the operator O selects the teaching adjustment option button 59, the trajectory history table 60 is displayed on the command editing window 54. The trajectory history table 60 includes the numbers of the teaching points, the position and posture of the machine 2 at each teaching point (XYZ are the coordinate values of each coordinate axis corresponding to the position of the machine 2, and WPR are amounts of rotation about each coordinate axis corresponding to the posture of the machine 2), the magnitude of the force applied to the work target W (Newton (N)), and an acting direction of the force applied to the work target W (positive direction or negative direction of a predetermined coordinate axis). In addition, the trajectory history table 60 may include the other parameters such as the approach speed of the machine 2 and the movement speed of the machine 2 relative to the work target W for each teaching point, or, although not shown, the registration function may include a separate parameter registration window, so that an initial value of another parameter may be previously registered.

Although the magnitude and direction of the force are associated with the motion trajectory for each teaching point, the trajectory history table 60 may also associate the force parameter with the motion trajectory for each predetermined motion section or for each predetermined time interval. Further, the teaching function may include a plurality of interval option buttons for switching a time interval at which the force parameter is associated with the motion trajectory. Since the number of teaching points for the force control command tends to be large, the operator O slides and views the trajectory history using the trajectory history scroll bar 61 and selects one or more teaching points to be adjusted, from the trajectory history table 60. Although not shown, the operator O may select one or more teaching points by selecting a predetermined motion section or a predetermined time interval.

The text color or background color of the parameter of the selected teaching point is highlighted in the trajectory history table 60. The operator O manually or automatically adjusts various parameters such as the position and posture of the machine 2, the magnitude and acting direction of the force at one or more selected teaching points.

The teaching adjustment function includes a teaching point selection list 62 for selecting the teaching point, a force adjustment box 63 for manually adjusting the magnitude of the force, and an acting direction adjustment box 64 for manually adjusting the acting direction of the force. Although not shown, the teaching adjustment function may include an approach speed adjustment box for manually adjusting the approach speed to the work target W, and a movement speed adjustment box for manually adjusting the movement speed of the machine 2. When the operator O selects one or more teaching points to be adjusted in the trajectory history table 60, the magnitude and the acting direction of the force at the selected one or more teaching points are displayed in the force adjustment box 63 and the acting direction adjustment box 64, respectively. The operator O performs the reteaching by manually adjusting the magnitude and the acting direction of the force in the force adjustment box 63 and the acting direction adjustment box 64, respectively.

The teaching adjustment function includes a position/posture adjustment box display button 67 configured to display a position/posture adjustment box 70 for manually adjusting the position and posture of the machine 2, as shown in FIG. 6. When the operator O selects one or more teaching points to be adjusted in the trajectory history table 60, a position/posture adjustment box display button 67 is displayed. When the operator O presses the position/posture adjustment box display button 67, the position and posture of the machine 2 at one or more selected teaching points are displayed in the position/posture adjustment box 70. The operator O manually adjusts the position and posture of the machine 2 in the position/posture adjustment box 70.

Although not essential, the teaching adjustment function preferably includes coordinate system selection boxes 68 and 69 for selecting the numbers of a user coordinate system and a tool coordinate system, respectively. The operator O selects desired user coordinate system and/or tool coordinate system using the coordinate system selection boxes 68 and 69.

The teaching adjustment function preferably includes an automatic adjustment button 65 for automatically adjusting the magnitude and the acting direction of force, the position and posture of the machine 2, and other parameters other than these, at one or more selected teaching points. The automatic adjustment is performed by direct teaching or playback teaching.

When one selected teaching point is to be retaught by direct teaching, the operator O presses the automatic adjustment button 65 to move the control point P of the machine 2 to the selected teaching point. Then, during the operator O holds the wrist of the machine 2 so that the tool 19 is pressed against the work target W, the reteaching is performed by obtaining the detection information of the force detector 18 and recording the magnitude and the acting direction of the force applied to the work target W determined from the detection information. The retaught magnitude and acting direction of the force are reflected in the trajectory history table 60, the force adjustment box 63, and the acting direction adjustment box 64, respectively.

When the plurality of selected teaching points are to be retaught by direct teaching, the operator O presses the automatic adjustment button 65 to move the control point P of the machine 2 to a start point among the plurality of selected teaching points. Then, during the operator O holds the wrist of the machine 2 so that the tool 19 is pressed against the work target W, the reteaching is performed by obtaining the detection information of the force detector 18 and recording the magnitude and the acting direction of the force determined from the detection information, the motion trajectory of the machine 2, and other parameters other than these. In addition, the motion trajectory and the other parameters may be retaught using the motion detector 21 or the vision sensor 17. The retaught magnitude and acting direction of the force, the motion trajectory and the other parameters other than these are reflected in the trajectory history table 60, the force adjustment box 63, the acting direction adjustment box 64, and the position/posture adjustment box 70, respectively.

When one selected teaching point is to be retaught by playback teaching, the operator O presses the automatic adjustment button 65 to move the control point P of the machine 2 to the selected teaching point. Then, during the operator O actually moves the machine 2 using the machine operation unit 30 of the controller 3, the reteaching is performed by obtaining the detection information of the force detector 18 by the adjusting unit 43*d* and recording the magnitude and the acting direction of the force applied to the work target W. The retaught magnitude and acting direction of the force are reflected in the trajectory history table 60, the force adjustment box 63, and the acting direction adjustment box 64, respectively.

When the plurality of selected teaching points are to be retaught by playback teaching, the operator O presses the automatic adjustment button 65 to move the control point P of the machine 2 to a start point among the plurality of selected teaching points. Then, during the operator O holds the wrist of the machine 2 so that the tool 19 is pressed against the work target W, the reteaching is performed by obtaining the detection information of the force detector 18 by the adjustment unit 43*d* and recording the magnitude and the acting direction of the force applied to the work target W, the motion trajectory of the machine 2, and other parameters other than these. In addition, the motion trajectory and the other parameters may be retaught using the machine operation unit 30 or the machine operation unit 44. Although not shown, the machine operation unit 44 displays a movement button and a posture change button, etc., on the machine operation window 56, for operating the model of the machine 2 on the simulation window 50. The retaught magnitude and acting direction of the force, the motion trajectory of the machine 2 and the other parameters other than these are reflected in the trajectory history table 60, the force adjustment box 63, the acting direction adjustment box 64, and the position/posture adjustment box 70, respectively.

It is preferable that the teaching adjustment function include a comment input box 66 for inputting an arbitrary comment for one or more teaching points. The operator O may enter a comment such as "manual adjustment" in the comment input box 66 when various parameters of the force control command are adjusted manually, and may enter a comment such as "automatic adjustment" in the comment input box 66 when the adjustment is performed automatically. By virtue of this, as to whether the parameter of the force control command has been adjusted manually or automatically can be identified.

After adjusting various parameters of the force control command, the operator O presses the test execution button 57 to execute a test of the adjusted force control command again. When the test is executed again online, the controller 3 actually operates the machine 2 according to the force control command to perform the force control for the machine 2. The operator O checks a result of the test (a result of processing, the motion trajectory of the machine 2, and a cycle time, etc.).

When the test is executed again offline, the simulation generation unit 46 operates the model of the machine 2 in the virtual space on the simulation window 50 according to the force control command, so as to perform the force control for the model of the machine 2. The operator O cannot check the processing result, but can check the motion trajectory of the machine 2 and a cycle time, etc. When there is no problem with the test result of the force control command, the operator O selects the teaching completion option button 58 to complete the teaching of the force control command. On the other hand, when there is a problem again with the test result of the force control command, the operator O readjusts the teaching of the force control command once more.

After the operator O selects the teaching completion option button 58 and completes the teaching of the force control command, the operator O generates and executes a motion program on the program execution window 80. The motion program may be executed online or offline. When executed online, the controller 3 actually operates the machine 2 according to the generated motion program to perform the force control for the machine 2. When executed offline, the simulation generation unit 46 operates the model of the machine 2 in the virtual space on the simulation window 50 according to the generated motion program to perform the force control for the model of the machine 2.

Figure 7:
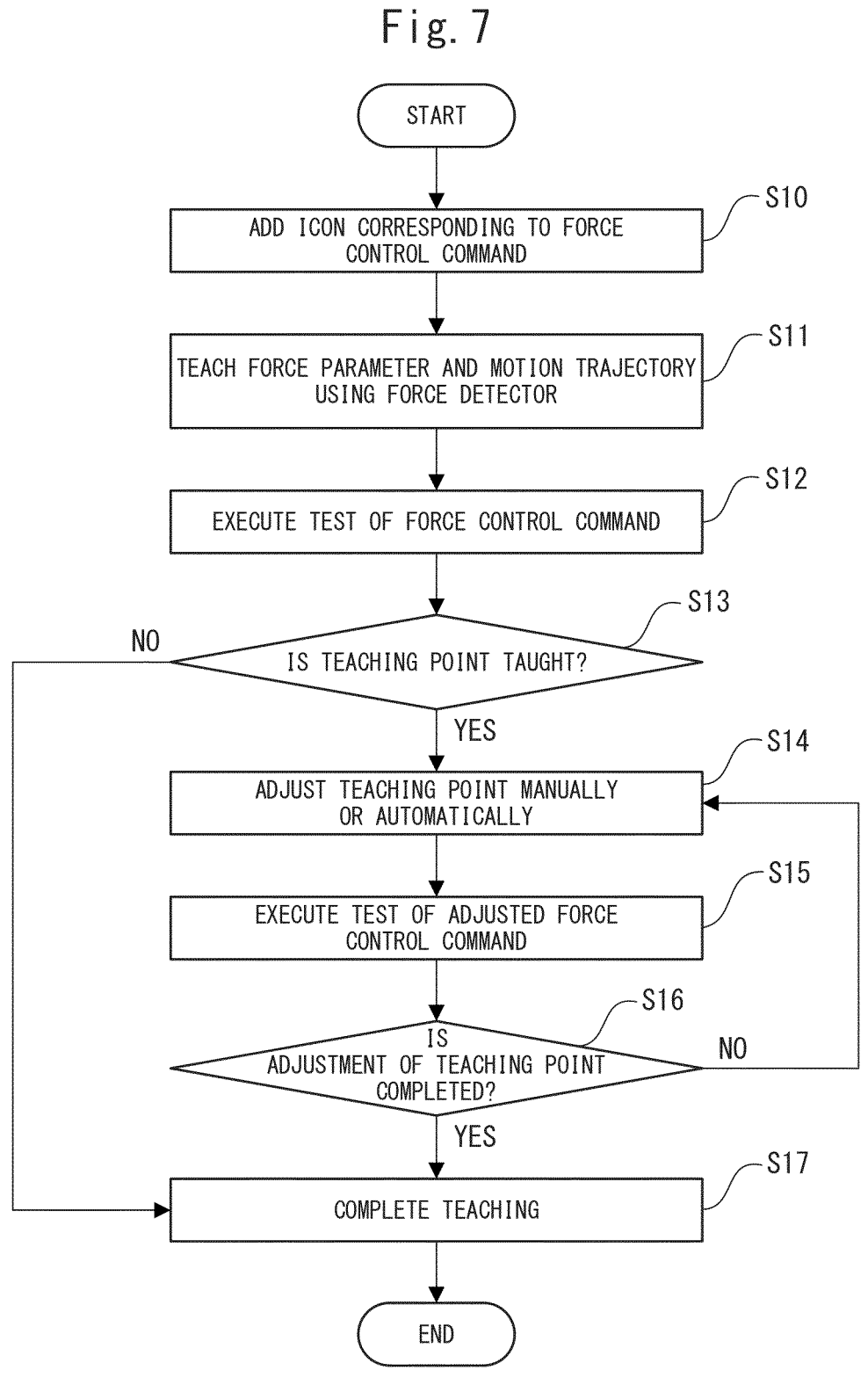
FIG. 7 is a flowchart showing an example of the force control teaching method.

An example of a teaching method for the force control is described below. FIG. 7 is a flowchart showing an example of the teaching method for the force control. This flowchart is executed by programming software. The program editing unit 42 adds the icon 53 corresponding to the force control command to the program editing window 51 (step S10). The teaching unit 43*b* uses the force detector 18 to associate the force parameter, the motion trajectory and other parameters other than these, etc., with each other, and simultaneously teach them (step S11). The test execution unit 43*c* executes a test of the taught force control command (step S12).

The operator O checks the test result and determines whether or not to adjust the teaching point of the force control command (step S13). When the teaching point of the force control command does not need to be adjusted (NO in step S13), the adjustment unit 43*d* completes the teaching of the force control command (step S17). When it is necessary to adjust the teaching point of the force control command (YES in step S13), the adjustment section 43*d* adjusts the teaching point manually or automatically (step S14).

The test execution unit 43*c* executes a test of the adjusted force control command again (step S15). The operator O checks the test result and determines whether or not the adjustment of the teaching point of the force control command is completed (step S16). When the adjustment of the teaching point of the force control command is not completed (NO in step S16), the adjustment of the teaching point of the force control command (step S14) and the test execution of the force control command (step S15) are repeated. When the adjustment of the teaching point of the force control command is completed (YES in step S16), the adjustment unit 43*d* completes the teaching of the force control command (step S17).

Figure 8:
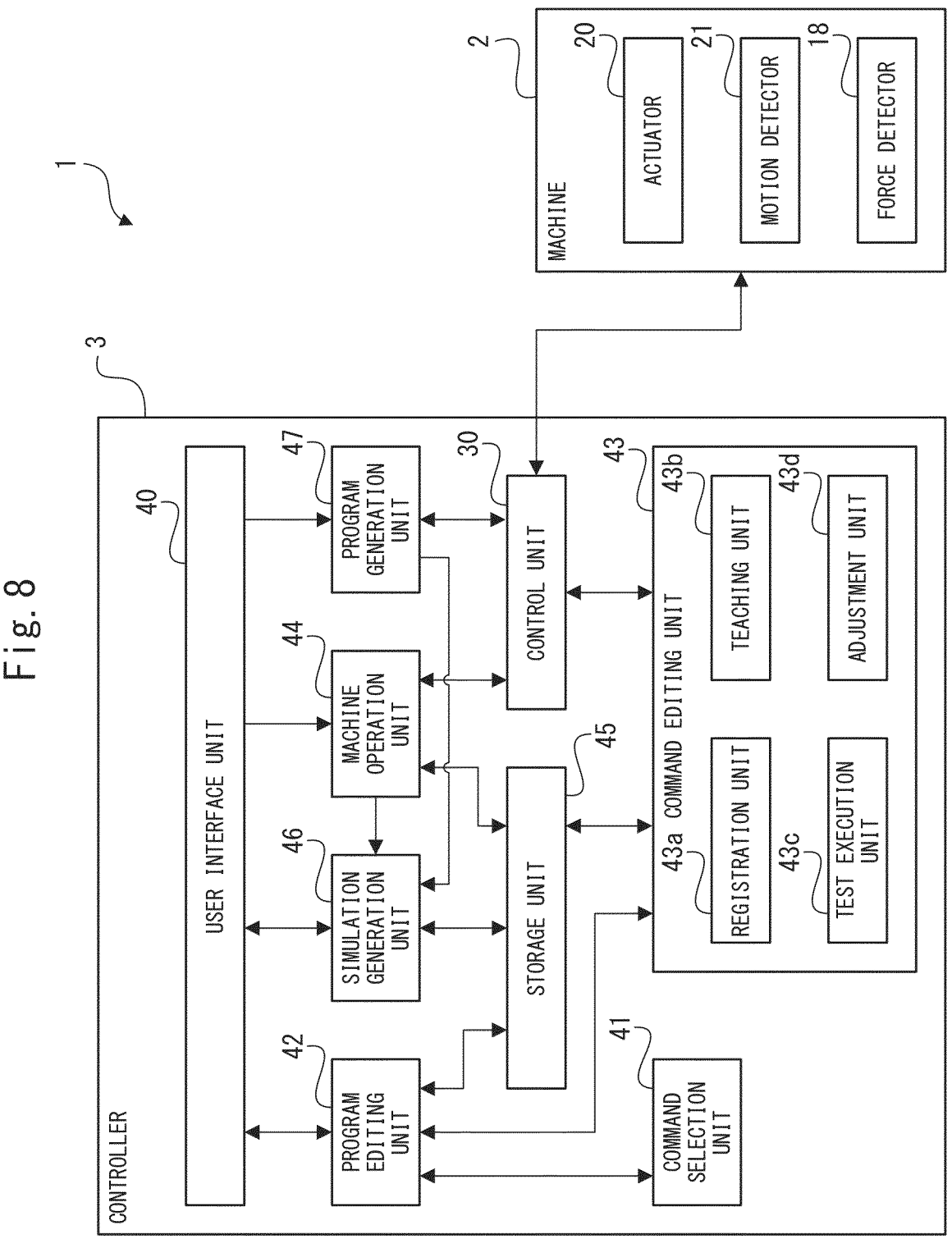
FIG. 8 is a functional block diagram of the mechanical system of a second embodiment.

Hereinafter, the configuration of the machine system 1 according to a second embodiment is explained. FIG. 8 is a functional block diagram of the machine system 1 of the second embodiment. The teaching method for the force control described above may not be implemented by the program generation software executed by the teaching device 4, but may be implemented by the program generation software executed by the controller 3. In the second embodiment, the mechanical system 1 does not include the teaching device 4, and the controller 3 has the components of the teaching device 4 of the first embodiment. Although the controller 3 includes a control unit 31 instead of the communication control unit 48 of the teaching device 4 of the first embodiment, the controller 3 may also include communication control unit 48.

According to the above embodiments, the force parameters of the force control command are associated with the motion trajectory of the machine for performing the force control, and thus the teaching of the force control can be easily performed.

The programs executed by the above-mentioned processor or other drive circuits, etc., may also be provided recorded on computer-readable non-transitory recording media such as a CD-ROM, etc. Alternatively, they may be provided distributed wired or wirelessly from a server device on a WAN (wide area network) or LAN (local area network).

Although various embodiments are explained herein, the present invention is not limited to the above-mentioned embodiments. It should be understood that various modifications can be made within the scope of defined in the claims.

REFERENCE SIGNS LIST

1 machine system
2 machine
3 controller
4 teaching device
5 program generation display
10 link (base)
11 link (rotating body)
12 link (upper arm)
13 link (forearm)
14-16 link (wrist elements)
17 vision sensor
18 force detector
19 tool
20 actuator
21 motion detector
30 machine operation unit
31 control unit
40 user interface unit
41 command selection unit
42 program editing unit
43 command editing unit
43*a* registration unit
43*b* teaching unit
43*c* test execution unit
43*d* adjustment unit
44 machine operation unit
45 storage unit
46 simulation generation unit
47 program generation unit
48 communication control unit
50 simulation window
51 program editing window
52 command selection window
53 icon representing force control command
54 command editing window
55 teaching button
55*a* teaching start button
55*b* teaching end button
56 machine operation window
57 test execution button
58 teaching completion option button
59 teaching adjustment option button
60 motion history table
61 motion history scroll bar
62 teaching point selection list
63 force adjustment box
64 acting direction adjustment box
65 automatic adjustment button
66 comment input box
67 position/posture adjustment box display button
68, 69 coordinate system selection box
70 position/posture adjustment box
80 program execution window
C1-C3 coordinate system
J1-J6 axis
L processing line P control point T motion trajectory W work target

The invention claimed is:

1. A teaching device, comprising:

a teaching unit configured to associate a force parameter of a force control command for a machine with a motion trajectory of the machine for performing force control, and teach the force parameter and the motion trajectory, using a force detector, wherein the teaching unit is configured to simultaneously teach the force parameter, the motion trajectory, and another parameter other than the force parameter and the motion trajectory, and the another parameter includes at least one of an approach speed of the machine to a work target or a movement speed of the machine.

2. The teaching device according to claim 1, wherein the teaching unit is configured to associate the force parameter with the motion trajectory by direct teaching or playback teaching, and record the force parameter and the motion trajectory.

3. The teaching device according to claim 1, further comprising a test execution unit configured to execute a test of the force control command.

4. The teaching device according to claim 1, further comprising an adjustment unit configured to manually or automatically adjust at least one of the force parameter, the motion trajectory or the another parameter other than the force parameter and the motion trajectory.

5. The teaching device according to claim 1, further comprising a registration unit configured to previously register the another parameter other than the force parameter and the motion trajectory as an initial value.

6. The teaching device according to claim 1, wherein the teaching unit includes a teaching start command for starting recording of teaching and a teaching end command for ending the recording of the teaching.

7. The teaching device according to claim 1, wherein the teaching unit is configured to associate the force parameter with the motion trajectory and stores the force parameter, for each teaching point constituting the motion trajectory, or for each predetermined motion section constituting the motion trajectory, or for each predetermined time interval during a motion.

8. The teaching device according to claim 1, wherein the teaching unit is configured to switch an interval at which the force parameter is associated with the motion trajectory.

9. The teaching device according to claim 1, wherein the teaching device includes a command editing unit configured to edit the force control command, and the command editing unit includes the teaching unit.

10. The teaching device according to claim 1, further comprising a program generation unit configured to generate a motion program for the machine based on the force control command.

11. The teaching device according to claim 1, wherein the force parameter includes a magnitude and an acting direction of a force applied to the work target.

12. A controller, comprising:

a teaching unit configured to associate a force parameter of a force control command for a machine with a motion trajectory of the machine for performing force control, and teach the force parameter and the motion trajectory, using a force detector;

a program generation unit configured to generate a motion program for the machine based on the force control command; and a control unit configured to operate the machine according to the motion program and perform a force control for the machine, wherein the teaching unit is configured to simultaneously teach the force parameter, the motion trajectory, and another parameter other than the force parameter and the motion trajectory, and the another parameter includes at least one of an approach speed of the machine to a work target or a movement speed of the machine.

13. A machine system, comprising:

a machine having a force detector;

a teaching unit configured to associate a force parameter of a force control command for the machine with a motion trajectory of the machine for performing force control, and teach the force parameter and the motion trajectory, using the force detector;

a program generation unit configured to generate a motion program for the machine based on the force control command; and a control unit configured to operate the machine according to the motion program and perform a force control for the machine, wherein the teaching unit is configured to simultaneously teach the force parameter, the motion trajectory, and another parameter other than the force parameter and the motion trajectory, and the another parameter includes at least one of an approach speed of the machine to a work target or a movement speed of the machine.

14. A teaching device, comprising:

a program editing unit configured to receive an addition of a force control command to a machine;

a command editing unit configured to associate force parameters including a magnitude and a direction of a force of the force control command with a motion trajectory of the machine, and teach or edit the force parameters; and a display unit configured to display information relating to a plurality of taught or edited force parameters including magnitudes and directions of the force control command associated with the motion trajectory.

15. The teaching device according to claim 14, wherein the command editing unit is configured to cause the display unit to display a teaching button representing starting or ending teaching of the force control command.

16. The teaching device according to claim 15, wherein the teaching device is configured to perform direct teaching in response to the teaching button representing starting of the teaching being pressed.

17. The teaching device according to claim 14, wherein the information is represented by a table showing teaching points indicating the motion trajectory, and the magnitude and the direction of the force corresponding to the teaching points.

18. The teaching device according to claim 14, wherein the command editing unit is configured to cause the display unit to display an execution button for executing a test of the force control command, and execute the test in response to the execution button being pressed.

19. The teaching device according to claim 14, wherein the command editing unit is configured to cause the display unit to display a screen for reteaching or reediting the information.

* * * * *